United States Patent [19]

Hausam

[11] 4,269,324
[45] May 26, 1981

[54] DISPENSER FOR PAPER-LIKE CONTAINERS

[76] Inventor: Leonard P. Hausam, 6801 50th Ave. North, Crystal, Minn. 55428

[21] Appl. No.: 810,529

[22] Filed: Jun. 27, 1977

[51] Int. Cl.³ .............................................. B65H 3/00
[52] U.S. Cl. .................................... 221/36; 221/220; 221/259
[58] Field of Search ....................... 221/36, 37, 39–43, 221/210, 213–216, 217, 220, 259

[56] References Cited

U.S. PATENT DOCUMENTS

| | | | |
|---|---|---|---|
| 1,455,241 | 5/1932 | Colosi | 221/40 |
| 1,846,227 | 2/1932 | Steffen | 221/259 |
| 2,615,774 | 10/1952 | Clief | 221/213 |
| 2,777,602 | 1/1957 | Genich | 221/39 |
| 3,477,612 | 11/1969 | Hoff | 221/40 |

FOREIGN PATENT DOCUMENTS 922969 4/1963 United Kingdom ....................... 221/36

*Primary Examiner*—H. Grant Skaggs
*Attorney, Agent, or Firm*—John W. Adams

[57] ABSTRACT

A dispenser for flexible open topped paper-like containers which includes an upper storage compartment for holding a stack of inverted containers to be dispensed through a dispensing opening formed in the bottom of said compartment, said dispenser also including a container engaging and gripping element mounted for movement into gripping engagement with the lower most container in the stack and thereafter delivering said container downwardly through the opening for easy access and use by the operator.

6 Claims, 5 Drawing Figures

DISPENSER FOR PAPER-LIKE CONTAINERS

BACKGROUND OF THE INVENTION

It has long been a problem to provide a dispenser for soft collapsible paper containers such as the filters used for coffee makers. In most instances such containers are stored in the shipping cartons in which they are received and removed by hand when needed.

The present invention provides a device which dispenses the containers one at a time from a stack of up-side-down containers and delivers the dispensed filter to the operator in right-side-up position ready for insertion into the coffee maker.

SUMMARY OF THE INVENTION

The present invention includes a storage compartment for holding a stack of flexible cup-shaped containers up-side-down position with a discharge opening in the bottom of the compartment through which a dispensing element delivers the containers one at a time, after removing the same from the bottom of the stack and presents the filter in right-side-up position ready for insertion by the operator into the coffee maker.

DETAILED DESCRIPTION OF THE DISCLOSED EMBODIMENTS

Figure 1:
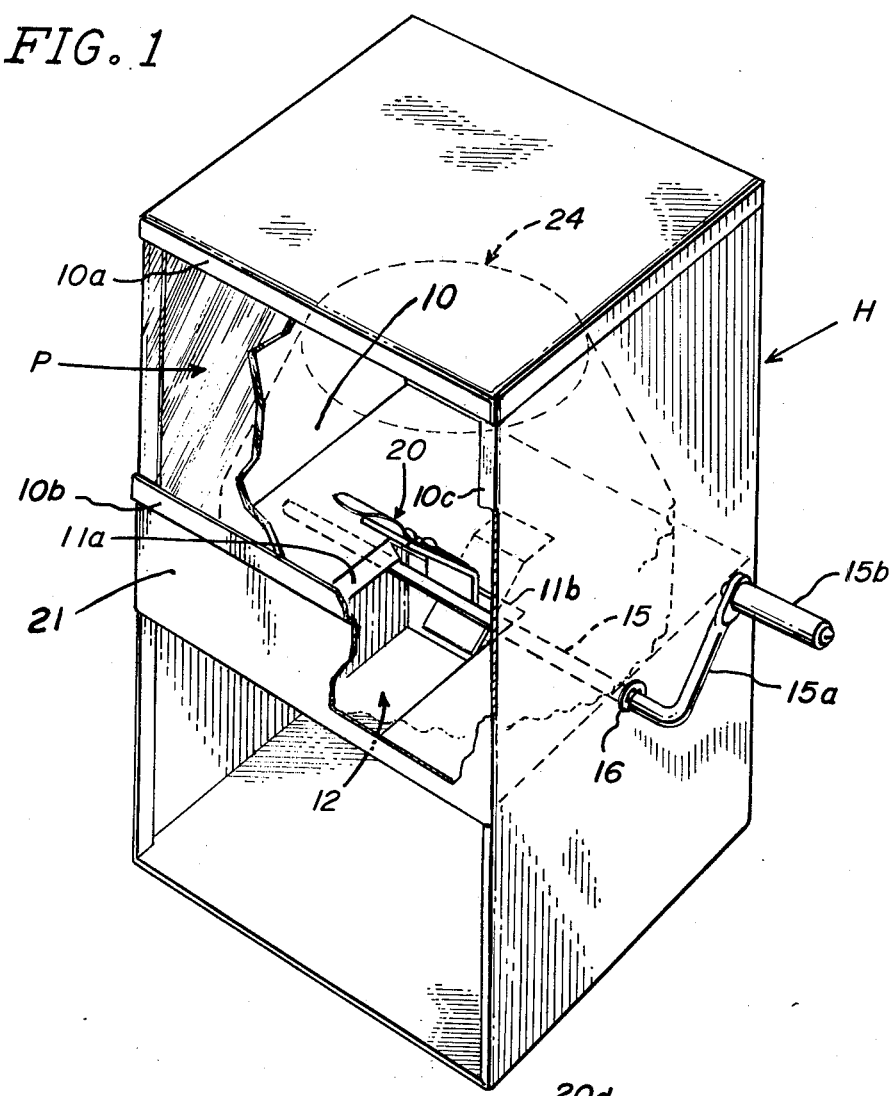
FIG. 1 is a perspective view showing a dispenser unit embodying the present invention and having a portion thereof broken away.

The dispenser unit illustrated in the drawings includes a housing H having an upper storage compartment 10 with a supporting platform 11 at the bottom thereof. A delivery opening 12 is provided in the platform 11 and the portions of said platform 11 and the portions of said platform on the sides of said opening 12 are smoothly contoured to form bevelled dispensing flanges 11a between which the filters may be drawn one at a time.

An actuating shaft 15 is journaled in said housing H and extends thereacross below said support platform 11. The shaft 15 is located behind the opening 12 at approximately the midpoint of the housing H, in the embodiment of the invention illustrated, and has a crank arm 15a connected to one end thereof for manual rotation as by the handle 15b. A pair of retaining clips 16 hold the shaft 15 against longitudinal movement.

Figure 3:
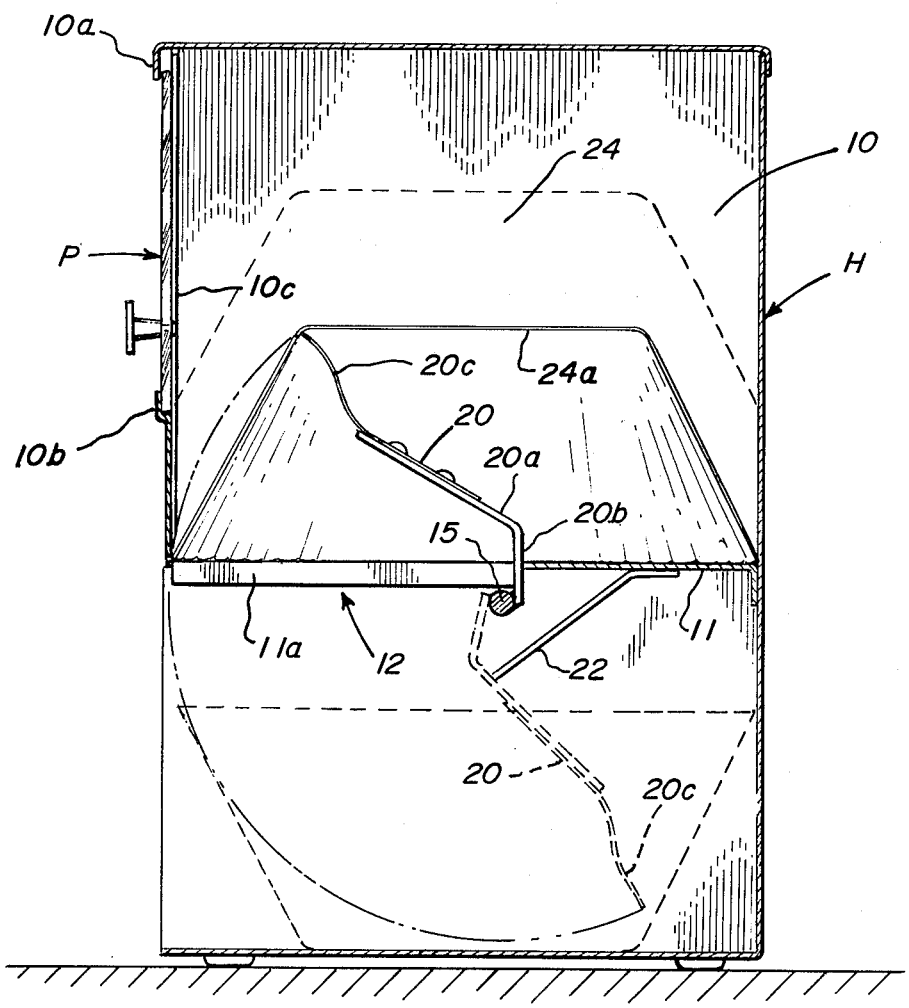
FIG. 3 is a vertical sectional view taken substantially along the line 3—3 of FIG. 2 showing the complete unit in vertical section and showing the dispensing element in its upper starting position in full lines and its lower final position by dotted lines.

A dispensing member such as the arm 20 is fixed to the shaft 15 and is positioned to move back and forth through the delivery opening 12 as illustrated. The shaft 15, crank arm 15a and handle 15b form suitable means for moving the arm 20 in an arcuate dispensing path through said opening 12. Suitable stop means for limiting upward movement of the arm 20 are provided, such as the edge portion 11b of the platform 11 at the rear of opening 12, which engages an abutment portion 20b formed by a bend 20a in the arm 20. A suitable stop element 22 is mounted on the bottom side of the platform 11 as best shown in FIG. 3, and engages the dispensing arm 20 at the bottom of the dispensing stroke as illustrated by the dotted line position in FIG. 3.

In the form illustrated, a fixed panel 21 is provided at the lower portion of the storage compartment 10 at the front of the housing and an access opening is provided above said panel 21. A removable transparent closure panel P is mounted in said access opening. A cover is secured to the top of housing H and a flange 10a is provided to confine the upper end of the removable panel P is closure position. A flange 10b is provided to confine the lower edge of said panel. A suitable knob is provided on the outside of the panel to permit the same to be lifted up into suitable space provided above the lower end of the upper flange 10a, a sufficient distance to permit the lower edge of the panel to be raised above the upper edge of the lower flange 10b and thus permit removal of the panel. The sides of the housing H are bent around the front edges thereof to form back stops 10c for the edges of the panel P.

The open topped containers such as the filter elements 24 are inserted into the storage compartment 10 above the platform 11. The stacked filter elements 24 are inverted with the open ends positioned downwardly. The walls of the housing H forming the sides of the compartment 10 are of a size to position the stack of filter elements 24 within said compartment so that the upper end of the arm 20 can be moved into initial engagement position with the upper portion of the side wall of the lowermost filter 24a as shown by full lines in FIG. 3. The upper end of the arm 20 engages and grips the inside of the side wall of the filter element to carry the filter down through the opening 12 formed in the platform 11, as illustrated. The filter element collapses around the dispensing arm as it passes through said opening 12 and the engaged side wall is carried around to the back of the housing and the filter is inverted into right-side-up position, and is presented at its delivery position, as shown by the dotted lines in FIG. 3.

Figure 2:
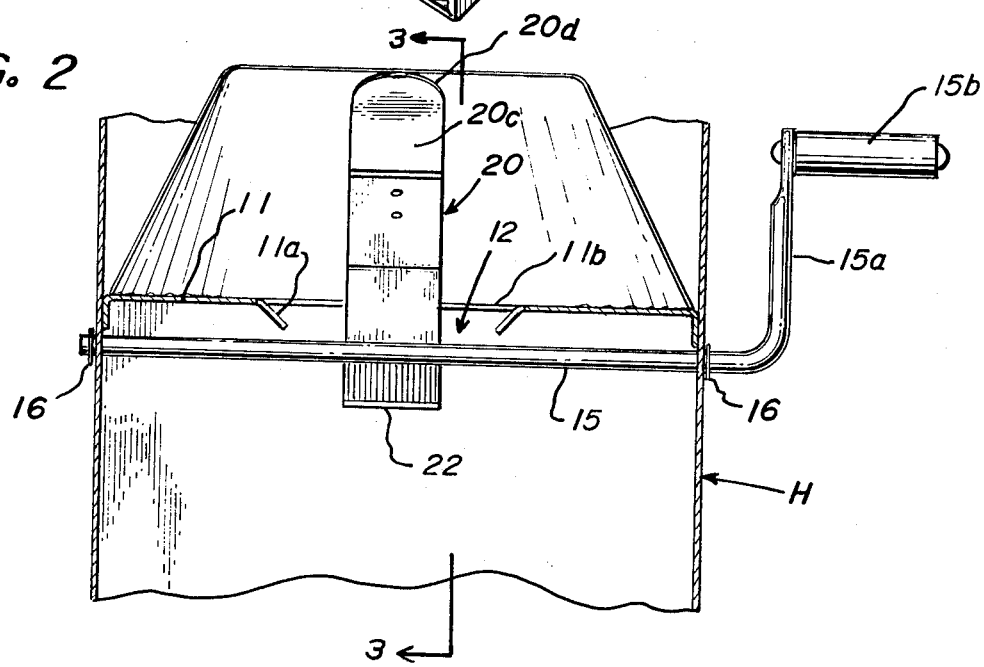
FIG. 2 is a front elevational view of a fragmentary portion of the dispenser unit shown in FIG. 1.
Figure 4:
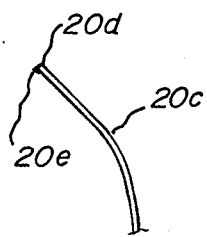
FIG. 4 is a fragmentary side view of a portion of the filter engaging and dispensing element; and, FIG. 5 is a front elevational view of the portion of the dispensing element shown in FIG. 4.
Figure 5:
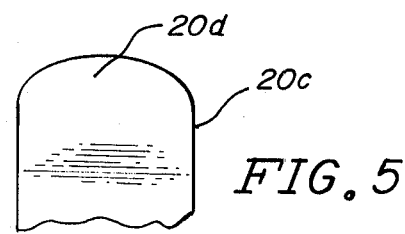

The end of the dispensing arm 20 may have a resilient leaf spring extension 20c which, in the form shown, has a rounded end portion 20d as shown in FIGS. 2, 4 and 5. The lower side of the rounded portion may be provided with a burr 20e which frictionally engages the side wall of the lowermost filter 24a to positively grip the same and remove it from the stack of filters 24. The outer end of the leaf spring 20c travels in an arc which is disposed in close association to the front panel and the front edge of the dispensing opening 12, as it travels down through said opening to deliver the filter element therethrough thus maintaining frictional contact with the arm 20.

It will be seen that the dispensing opening 12 is substantially narrower than the diameter of the filters being stored in the compartment so that the bottom filter being dispensed through the opening will collapse around the arm 20 as it passes down between the flanges 11a and thus insuring positive dispensing through the opening and also insure the removal of the engaged bottom filter while retaining the other filters in the platform.

It will be seen that this invention provides a relatively simple yet highly efficient dispensing device for flexible paper-like containers, whereby the same may be positively engaged and dispensed one at a time from a storage compartment.

It will, of course, be understood that various changes may be made in the form, details, arrangement and proportions of the parts without departing from the scope of this invention, which generally stated, is set forth in the appended claims.

What is claimed is:

1. A dispenser for flexible paper-like containers comprising:

a storage compartment having means for supporting and positioning a stack of inverted cup-shaped flexible paper-like containers, said means having a restricted delivery opening formed in the bottom thereof, and smaller than the containers, a resilient dispensing member mounted for movement downwardly in an arcuate dispensing path extending through said restricted opening from initial gripping engagement position with the underside of the bottom container to a delivery position below said container supporting means, said movement being limited by at least one stop means, and means for arcuately moving said member through said path from initial engagement position with the bottom container downwardly through said restricted delivery opening to invert the container and thus present the dispensed container in top side up delivery position.

2. The structure set forth in claim 1 and said means for moving said dispensing member comprising a shaft having the dispensing member fixed in radially extending position thereon, and means for producing rotation of the shaft to move said dispensing member through said dispensing path and back into initial engagement position.

3. The structure set forth in claim 2 and said dispensing member being mounted so that the dispensing path of the container engaging end of said member passes in close association to one side of the delivery opening to maintain gripping contact between said member and said container during travel thereof through said opening.

4. The structure set forth in claim 3 wherein the width of the opening is substantially less than the width of the storage compartment to permit the bottom container to be withdrawn from the stack while retaining the remaining containers in said storage compartment.

5. The structure set forth in claim 1 and the container engaging end of said dispensing member being convexly curved to prevent damage to the engaged bottom container during the dispensing operation.

6. The structure set forth in claim 5 wherein said dispensing member is provided with a gripping element on the end thereof to materially increase the frictional engagement with the bottom container during the dispensing operation.

* * * * *